United States Patent [19]

Dinger

[11] 4,291,355
[45] Sep. 22, 1981

[54] PROGRAMMABLE OVERLOAD CIRCUIT

[75] Inventor: Edward H. Dinger, Waynesboro, Va.

[73] Assignee: General Electric Company, Salem, Va.

[21] Appl. No.: 61,683

[22] Filed: Jul. 30, 1979

[51] Int. Cl.³ .......................................... H02H 7/085
[52] U.S. Cl. ...................................... 361/31; 361/96; 361/25; 364/492; 364/480; 318/800; 318/334
[58] Field of Search ...................... 361/31, 24, 25, 27, 361/23, 93, 94, 95, 96, 97, 103; 318/782, 806, 800, 334, 434, 696; 364/483, 492, 494, 705, 480, 105, 107, 111, 557, 605, 607

[56] References Cited

U.S. PATENT DOCUMENTS

| | | | |
|---|---|---|---|
| 3,814,913 | 6/1974 | Ironside et al. | 364/111 |
| 3,854,354 | 10/1974 | Boothman | 361/24 |
| 3,964,020 | 6/1976 | Dickerson | 361/93 X |
| 4,021,700 | 5/1977 | Ellis-Anwyl | 361/31 X |
| 4,071,745 | 1/1978 | Hall | 364/557 X |
| 4,115,860 | 9/1978 | Atwater | 364/492 |
| 4,125,895 | 11/1978 | Buhlmann | 364/492 X |
| 4,161,027 | 7/1979 | Russell | 364/492 |
| 4,174,496 | 11/1979 | McFall et al. | 361/97 X |
| 4,204,249 | 5/1980 | Dye et al. | 364/492 X |

OTHER PUBLICATIONS

"Fault Protection with a Digital Computer", by G. D. Rockefeller, I.E.E.E. Transactions on Power Apparatus, vol. PA S-88, No. 4, Apr. 1969.

Primary Examiner—Patrick R. Salce
Attorney, Agent, or Firm—Arnold E. Renner

[57] ABSTRACT

Disclosed is an overload protective circuit for an electric motor which is adaped to monitor and track motor temperature as a function of an operating parameter, namely armature current. The motor's armature current is sensed and converted to a multi-bit digital signal which is used to address a programmable read only memory (PROM) which has been pre-programmed with discrete digital values of temperature for a plurality of armature currents for the motor being protected. The digital address signal for the armature motor current is periodically updated at a relatively rapid rate and depending upon the armature current sensed, multi-bit temperature values are outputted from the PROM to a digital latch which operates a relatively slower rate to output another address back to the PROM so as to predict what the temperature will be at the next time increment based on the present current value and the present temperature. When predetermined temperature levels are reached, two bits of the PROM's output are respectively adapted to provide an alarm signal, and then a subsequent trip signal which is adapted to deenergize the motor.

15 Claims, 4 Drawing Figures

PROGRAMMABLE OVERLOAD CIRCUIT

BACKGROUND OF THE INVENTION

This invention relates generally to an overload control circuit for a DC motor and more particularly to a digital control circuit including means providing programmable time relationships between input armature current which affects motor temperature and multiple digital output signals which are adapted to signal overload alarm and trip conditions.

Load overheating from electrical resistance type losses is of particular concern for motor and other similar type loads since the overheating increases generally as the square of the current drawn thereby. As a consequence, various types of protective means have been employed in the past for disconnecting the motor from the power source before damage can occur. While various types of electromechanical overload trip relay type circuitry have been employed, more recently, solid state devices and digital implementations are being utilized. The following compilation represents teachings of prior art practice of solid state implementations of motor overload protective circuitry: U.S. Pat. No. 3,735,219, "Thermal Protection Device For Linear Motor", Kahn, et al., May 22, 1972; U.S. Pat. No. 3,845,354, "Solid State Thermal Overload Indicator", Boothman, et al., Oct. 29, 1974; U.S. Pat. No. 3,927,359, "Engine Starter Motor Control For Preventing Damage During Hydraulic Lock", Chen, Dec. 16, 1975; U.S. Pat. No. 4,021,700, "Digital Logic Control System For Three Phase Submersible Pump Motor", Ellis-Anwyl, May 3, 1977; and U.S. Pat. No. 4,041,540, "Solid State Overload Relay Circuit", Kamph, et al., Aug. 9, 1977.

The aforementioned U.S. Pat. No. 4,021,700 demonstrates that prior art control systems are relatively complex and are of costly construction requiring considerable space while consumming substantial power. In contrast, the system disclosed in U.S. Pat No. 3,845,354 achieves its desired results by means of a low cost, low power, highly efficient and reliable control system that can be contained within a very small fraction of the space needed by prior systems. It is to be noted that the present invention also achieves the desired results in yet an improved manner.

SUMMARY OF THE INVENTION

It is therefore an object of the present invention to provide an improved overload protection circuit for electric motors.

Another object is to provide a programmable solid state overload protective circuit.

It is still a further object to provide a motor protective circuit which is adapted to sequentially provide separate outputs to initially indicate an alarm condition and thereafter activate an overload trip device in response to excess temperature being sensed as a function of motor current.

These and other objects are accomplished through the provision of a digital memory for example, a PROM or programmable read only memory, which has been pre-programmed with digital data corresponding to a motor's thermal characteristics, for a predetermined number of motor armature current parameter values. Means are included for sensing the analog value of motor current. This motor current value is then converted to a multi-bit digital word which is coupled to the PROM as an address. Depending upon the current sensed, the PROM outputs a multi-bit data word, a portion of which corresponds to temperature. This temperature value is fed to a periodically triggered digital latch circuit which has its output fed back to the input of the PROM as another multi-bit address. Means are included for updating the analog to digital conversion of the sensed motor current and means are also included for triggering the latch such that present values of temperature are addressed to the PROM for a particular motor current sensed. The PROM, however, outputs a predicted temperature value that the motor will rise to at the next triggering interval, taking into account the temperature that existed at the start of that time interval. The PROM is thus programmed for discrete values of motor current to predict what the motor temperature will be at the next latch trigger time based on the present motor current value and the present temperature. Another portion of the output data word from the PROM is adapted to signal the reaching of first and second temperature levels for activating, for example, first an alarm light and then a motor trip circuit. Also, means are included for permitting fast resetting of the PROM under predetermined operating conditions and upon demand to monitor PROM outputs as a function of current at an accelerated rate.

BRIEF DESCRIPTION OF THE DRAWINGS

While the present invention is particularly defined in the claims annexed to and forming a part of this specification, a better understanding can be had from the following description taken in conjunction with the accompanying drawings in which:

DETAILED DESCRIPTION

Figure 1:
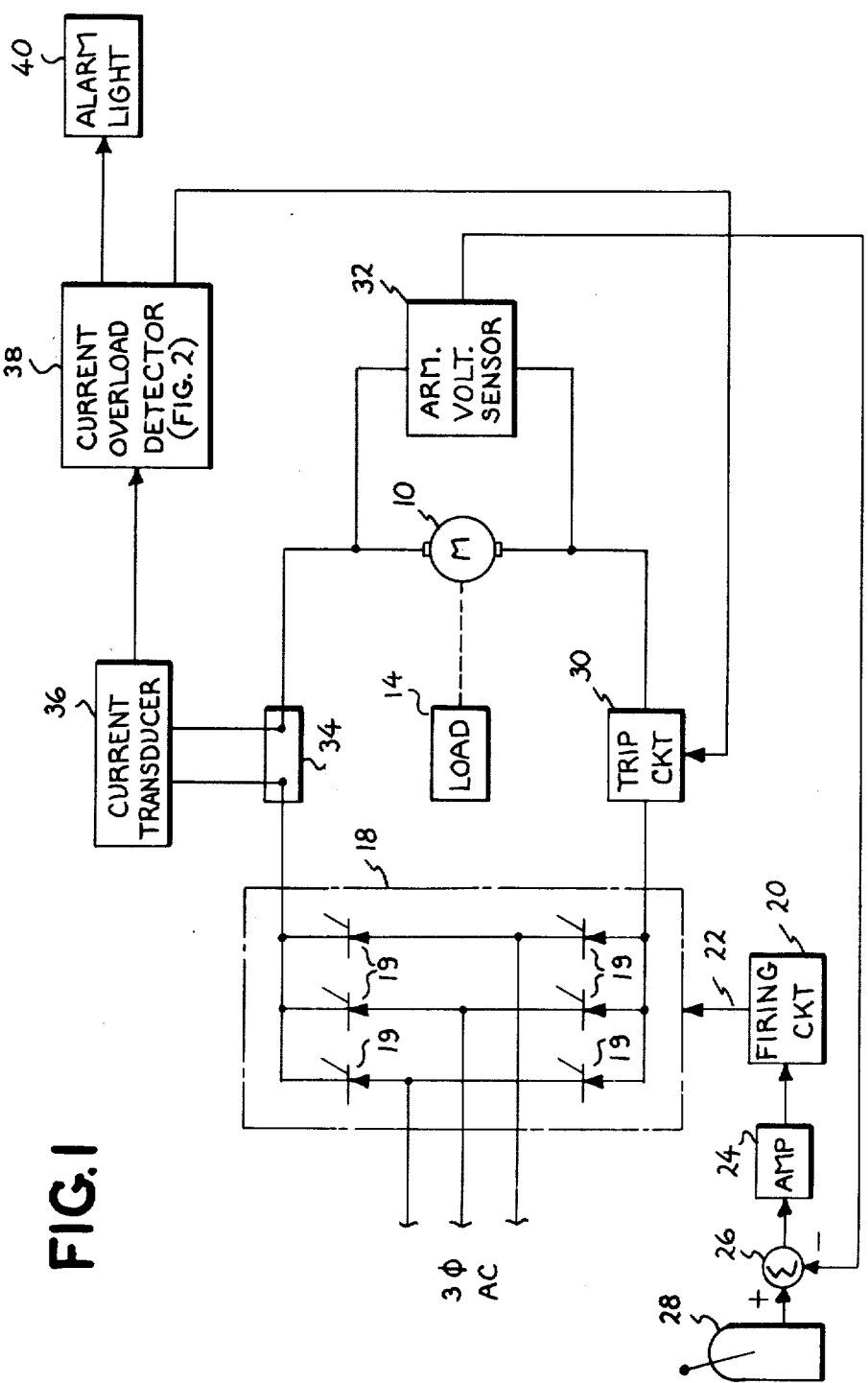
FIG. 1 is an electrical block diagram generally outlining the operational environment of the present invention.

Referring now to the drawings wherein like reference numerals refer to like circuit components throughout, reference is first made to FIG. 1 which is broadly illustrative of a thermal protection circuit for a DC motor powered from a controlled rectifier or thyristor controlled AC to DC converter circuit. More particularly, reference numeral 10 designates a DC motor for driving a suitable load 14 coupled thereto by means of a mechanical link indicated generally by the dotted line 16. Power is supplied to the motor 10 by way of an AC to DC converter 18 preferably in the form of a full wave rectification bridge configuration coupled to a three phase ($3\phi$) 60 Hz alternating current (AC) source, not shown. The bridge configuration comprises selectively fired controlled rectifiers or thyristors 19 to thus supply full wave rectified power to the motor 10. If bi-directional operation of the motor is desired, a second bridge can be added in the manner well known in the art. In this type of bridge circuit there is included a pair of thyristors for each phase of the $3\phi$ AC source such that controlling the period of time during which an individual thyristor is rendered conductive during its respective 180° period of source voltage, the amount of power applied to the to the motor may be controlled. The converter 18 is under the control of a thyristor firing circuit 20 which supplies pulses to the various thyristors in a well known manner via circuit lead 22. The time at which the firing circuit 20 provides the required pulses is a function of a signal derived from an amplifier 24 which in turn receives an error signal from a summing junction 26 which is adapted to receive signals proportional to the desired motor voltage as provided by the controller 28 for example, and the actual motor voltage (e.g., motor speed) which is provided, for example, by means of the voltage sensor 32 coupled across the armature of the motor 10.

The exact nature of the error signal circuit is not material to the present invention and may take any of several of the known forms which is adapted to provide for basic motor control. What is significant, however, is that a circuit interrupter such as trip relay circuit 30 is included with the motor 10 to disconnect the applied power in the event of thermal overload which results from excess motor current. In the embodiment shown the trip circuit is in series with the motor; however, when desirable it could be located on the AC side of the converter. In FIG. 1 motor current is the parameter sensed and is accomplished by means of a low resistance shunt 34 and a current transducer 36 coupled thereto which is adapted to output a signal voltage corresponding to motor current in the amature. This signal voltage is coupled to circuitry embodying the subject invention and is designated by reference numeral 38. This circuitry comprises a current overload detector circuit of an improved type which is adapted to initially energize an alarm light 40 when a predetermined motor temperature is reached and thereafter activate the trip circuit 30 when a thermal overload condition is reached.

Figure 2:
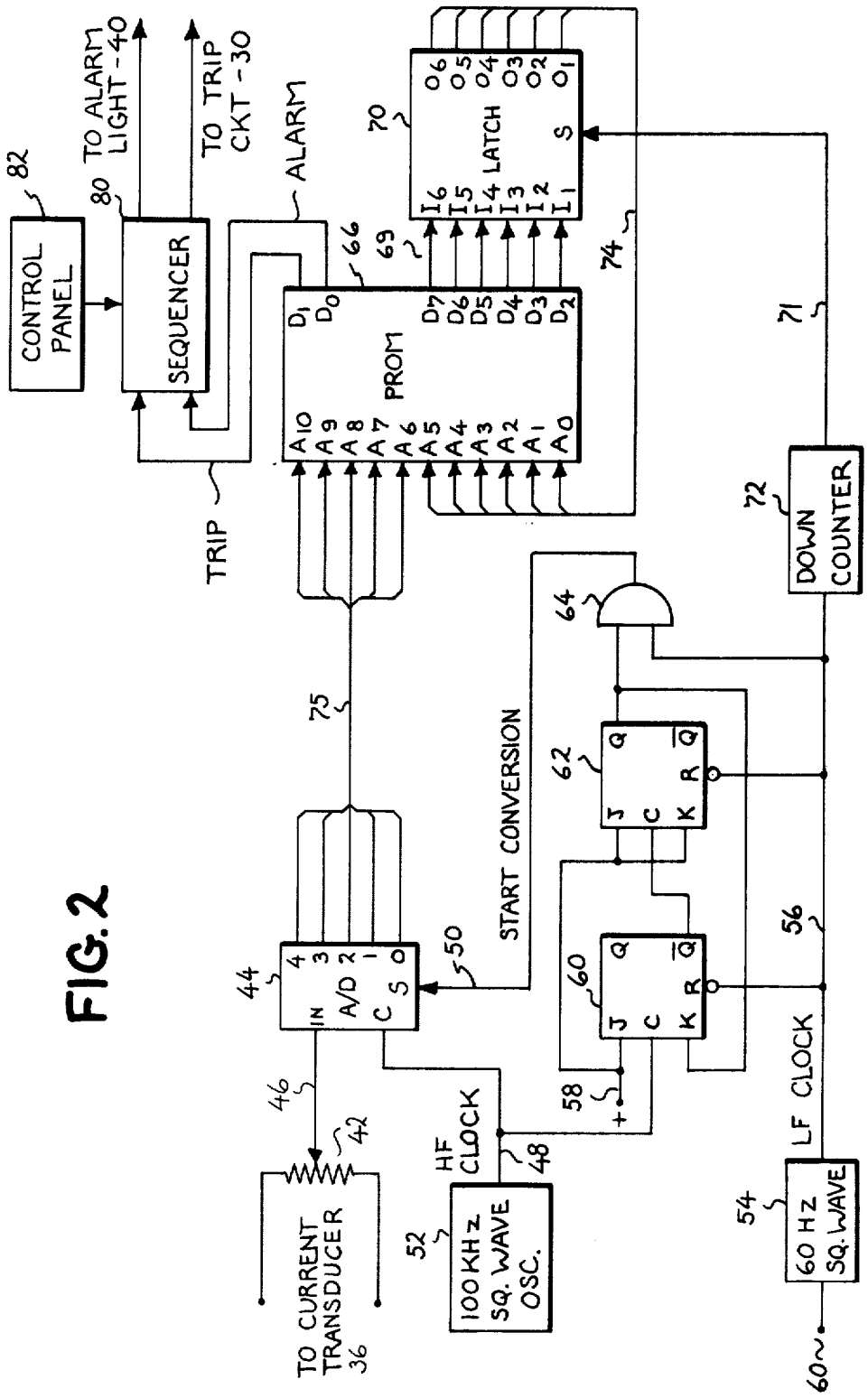
FIG. 2 is an electrical block diagram illustrative of a first embodiment of the present invention.

Turning attention now to the invention proper, reference is made to FIG. 2 wherein a first embodiment of the present invention is disclosed. Reference numeral 42 denotes a potentiometer coupled across the output of the current transducer 36 shown in FIG. 1. The voltage at the slider element of the potentiometer 42 comprises an analog voltage signal proportional to the absolute value of the motor armature current. This analog signal is coupled via circuit lead 46 to the input terminal of an analog to digital (A/D) converter 44 which is adapted to provide a five bit (0, 1, 2, 3 and 4) digital output word on data bus 75 corresponding to the input via line 46. The A/D converter 44 is clocked; i.e., operated in response to a clock signal applied to its C input by means of circuit lead 48. In addition to having the clock signal applied thereto, the converter 44 begins operation or initiates a new conversion whenever a "start conversion" signal is applied over circuit lead 50 to its S terminal. The analog to digital converter 44 may be a conventional solid state integrated circuit device such as a National Semiconductor ADC0800 circuit module. The clock signal for the A/D converter 44 is provided by means of a square wave oscillator circuit 52 which for convenience is operable at 100KHz. The frequency, however, may be of any suitable value adapted to operate the converter. The analog to digital conversion is initiated by means of a "start conversion" trigger pulse generated once per cycle of the 60 Hz AC line frequency. This trigger pulse is derived in the following manner. A waveform squaring circuit 54 of a conventional design is coupled to the 60 Hz line voltage to provide a 60 Hz square wave output on lead 56. This signal comprises a low frequency clock signal, whereas the 100 KHz square wave output from the oscillator 52 and appearing on lead 48 constitutes a high frequency clock signal. The "start conversion" trigger pulse is produced by means of a pair of intercoupled J-K flip-flops 60 and 62 and an AND gate 64. The high frequency clock signal on lead 48 is applied to the C input of flip-flop 60, while the C input of the second flip-flop 62 is coupled to the Q output of flip-flop 60. The Q output of flip-flop 62 is coupled to one input of an AND gate 64. Also the Q output of flip-flop 62 is coupled back to the K input of flip-flop 60. The J input of flip-flop 60 as well as the J and K inputs of flip-flop 62 have a positive potential applied thereto via circuit lead 58. Both reset terminals R of flip-flop 60 and 62 as well as the second input of the AND gate 64 are connected to lead 56 and consequently to the low frequency 60 Hz clock signal from the squaring circuit 54.

In operation, on the negative going edge of the square wave of the 60 Hz low frequency clock signal, the flip-flops 60 and 62 are reset. Upon first occurrence of the high frequency clock signal applied to the C input of flip-flop 60, the Q output of flip-flop 62 will go high for one count, which upon the coincidence of a high signal applied to the AND gate 64, a "start conversion" pulse exists at the output of the AND gate 64. Since each of the flip-flops constitute a ÷ 2 circuit, after four cycles of the high frequency clock output from the square wave oscillator 52 flip-flop 60 is disabled until reset due to the connection between the Q output of flip-flop 62 back to the K input of flip-flop 60. The flip-flops 60 and 62 are reset by the 60 Hz low frequency clock applied to the respective R inputs. Thus the A/D conversion is recycled or updated once per every 60 Hz cycle, which corresponds to a relatively high rate in relation to the description to follow.

Figure 3:
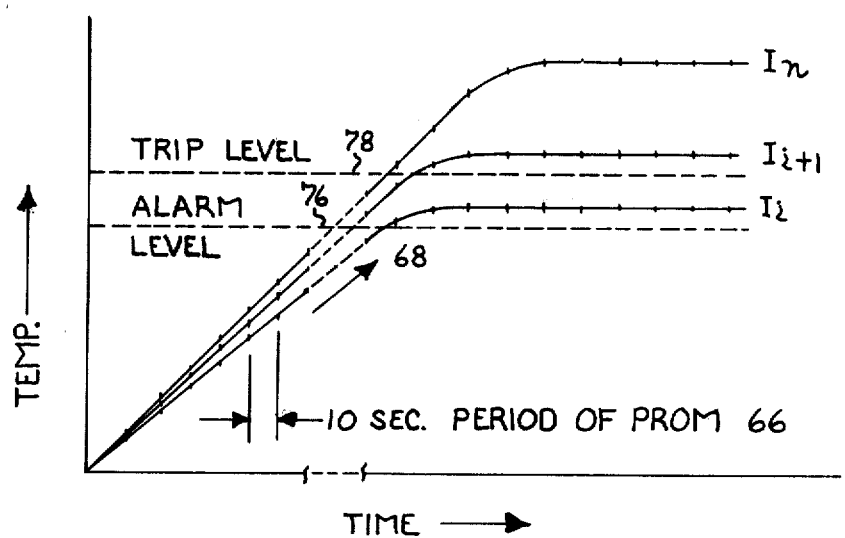
FIG. 3 is a graph helpful in understanding the operation of the present invention.

Turning attention now to the heart of the subject invention, reference numeral 66 designates a digital memory, preferably a programmable read only memory (PROM), such as Intel type 2716 EPROM, having at least eleven bit address lines $A_0, A_1 \ldots A_{10}$ and eight bit output lines $D_0, D_1 \ldots D_7$. When desirable, a ROM or other known types of memory can be utilized. PROM 66 is adapted to be pre-programmed in a well known manner with, among other things as will be explained, digital data corresponding to the empirically derived temperature characteristic curves of the motor 10 utilized for a plurality of discrete motor current values. The PROM 66 of this example is capable of storing 2048 data words and is accordingly programmed to digitally store motor temperature values denoted by reference numeral 68 as shown in FIG. 3 for up to 32 different curves for constant motor current values $I_i$ through $I_n$. These values are selected for 10 second operational periods of the PROM 66 as will be explained.

The PROM 66 is adapted to operate in conjunction with a multi-bit digital latch 70 such as Texas Instrument type LS374, which includes at least six input lines $I_1, I_2 \ldots I_6$ and six output lines $O_1, O_2 \ldots O_6$. The latch 70 additionally includes a terminal S which is adapted to receive a trigger signal via circuit lead 71 from a counter circuit 72. The counter circuit is coupled to the low frequency clock signal outputted from the 60 Hz squaring circuit 54. The counter 72 typically comprises a Texas Instrument type LS193 integrated circuit and is adapted to be responsive to the 60 Hz clock signal appearing on lead 56 and output a trigger pulse to the latch 70, for example, once every ten seconds, a relatively low rate in comparison to the rate which the A/D converter 44 is adapted to operate. Each time latch 70 is triggered, the data bits applied to its input lines $I_1 \ldots I_6$ from output lines $D_2 \ldots D_7$ of the PROM 66 are transferred and latched at its output lines $O_1 \ldots O_6$. This latched output in turn is coupled via a data bus 74 back to the address lines $A_0 \ldots A_5$ of the PROM 66. As indicated in FIG. 2, the remaining five address lines $A_6 \ldots A_{10}$ of the PROM are coupled by means of data bus 75 to the five bit data word from the A/D converter 44 which, as noted previously, is a digital representation of the absolute value of the motor armature current. Accordingly, a complete address word to the PROM 66 includes data both as to present armature current and temperature. Current data bits are supplied to input lines $A_6 \ldots A_{10}$ while temperature data bits are supplied to input lines $A_0 \ldots A_5$.

The PROM is operable in combination with the latch 70 to output at 10 second intervals an eight bit data word, six bits of which ($D_2 \ldots D_7$) represent a temperature value while the remaining two bits ($D_0$ and $D_1$) represent respective values which are adapted to initiate alarm and trip control functions. The digital temperature value on output lines $D_2 \ldots D_7$ represents the predicted temperature the motor will reach in the succeeding or next 10 seconds for the instantaneous motor current sensed. The predicted value is coupled via data bus 69 to the six input lines $I_1 \ldots I_6$ of the latch 70. Accordingly, depending upon the digital value of instantaneous motor current provided from the A/D converter 44 and fed to the PROM address lines $A_6 \ldots A_{10}$ and the present temperature value existing at the address lines $A_0 \ldots A_5$, as a result of the previous prediction in the immediate past 10 second period, the PROM will output the next predicted temperature value on output lines $D_2 \ldots D_7$. A bootstrapping action thus takes place. If such a temperature constitutes a safe value, the binary value of the data bits on lines $D_0$ and $D_1$ will have a predetermined value, for example, a binary "0" otherwise a binary "1". The PROM 66 will as time elapses index and output successive digital temperatue values and in effect predict what the temperature will be when the next trigger pulse is applied based upon the current value at present temperature. If the next temperature value is above a predetermined level, the PROM 66 will output an opposite binary value; e.g., a binary "1" on line $D_0$, indicating an alarm condition. The remaining output lines $D_1$ will output a digital signal of a binary "1" value, for example, upon a yet higher temperature value being reached indicating a trip signal condition. Such a condition is illustrated in FIG. 3 where the temperature values existing at the levels indicated by the dotted lines 76 and 78 correspond to the predetermined alarm and trip temperatures for certain values of motor current; e.g., $I_{n+1}$ and $I_n$. For lower values such as $I_i$ and $I_{i+1}$ these levels are never reached. The alarm and trip signals outputted on lines $D_0$ and $D_1$ of the PROM 66 accordingly are adapted to energize the alarm light 40 and activate the trip circuit 30 shown in FIG. 1. This is accomplished through a control element referred to as a sequencer 80. This element forms no part of the present invention; however, it is found in conventional motor controls to produce output control signals such as a control trip signal on its output lines in response to command signals from pushbuttons, limit switches or low level control signals such as those of the alarm or trip signal on its output lines.

While the embodiment shown in FIG. 2 is directed to illustrating a PROM based circuit which is programmed to output alarm and trip control signals at specified temperature levels, the basic circuit shown therein is adapted to accommodate several modifications which, for example, can provide recalibration of the current signal in the event the motor is stopped to reflect the loss of motor fan cooling and also for permitting an accelerated reset of the PROM. Such modifications are easily implemented into the basic circuitry shown in FIG. 2.

Figure 4:
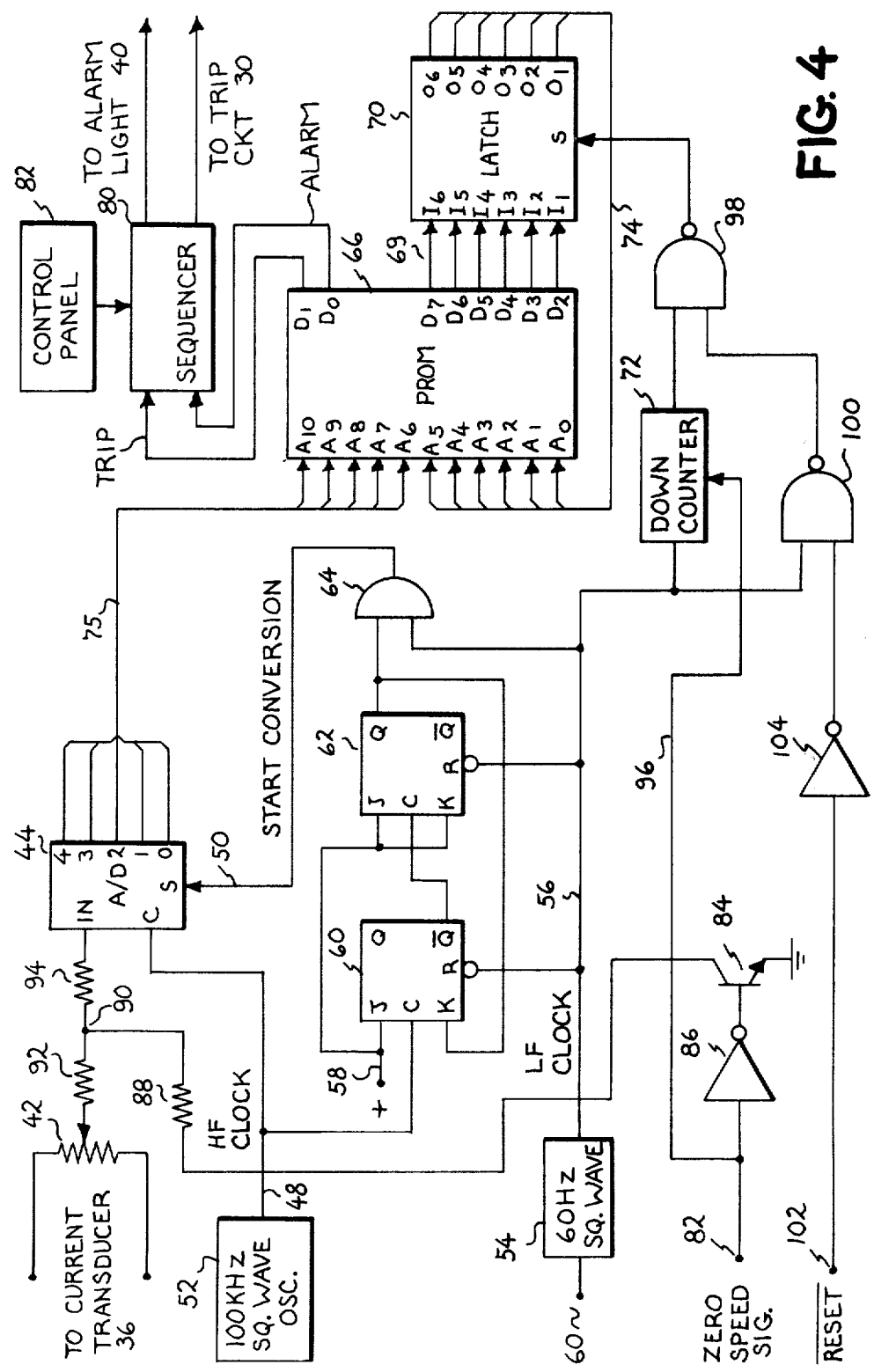
FIG. 4 is a block diagram illustrative of a second embodiment of the present invention.

Referring now to FIG. 4, in order to provide recalibration of the current signal supplied to the A/D converter 44 to reflect a predicted temperature change characteristic when the motor 10 (FIG. 1) is stopped, a zero speed signal is generated which is coupled to a signal terminal 82. This signal terminal is coupled to the base of an n-p-n transisitor 84 through an inverting amplifier 86. The emitter being grounded, the collector of transistor 84 is coupled to the input terminal of the A/D converter 44 by means of the resistor 88 coupled to a circuit junction 90 existing between the series connected resistors 92 and 94 which couple potentiometer 42 to the input of the A/D converter 44. Additionally, a circuit lead 96 is coupled from the zero speed signal input terminal 82 to the down counter 72 which has the effect of changing the circuit's operational time base; i.e., speed up the triggering interval of the latch 70 for a zero speed condition. To effect this, the output of the counter 72 is coupled to the S terminal of the latch 70 through a NAND gate 98.

In order to operate and accordingly reset the PROM 66 at an accelerated rate, for example at a 60 Hz rate, rather than being addressed every 10 seconds by the latch 70 a second NAND gate 100 is provided having one of its inputs connected to the low frequency clock signal appearing at the output of the 60 Hz square wave circuit 54. The other input to the NAND gate 100 is coupled to a signal input terminal 102 which is adapted to receive a conveniently available RESET signal from a source, not shown. Because a RESET is applied a signal inverter 104 is coupled intermediate the NAND gate input. Should a RESET signal be applied the inverter 104 would be deleted. The presence of a RESET signal at terminal 102 will output a 60 Hz from the NAND gate 100 which is applied to the triggering input terminal S of the latch 70 through the NAND gate 98. When desirable, this feature also makes it possible to check PROM temperature outputs which are outputted at $D_2 \ldots D_7$ as a function of current at an accelerated rate.

Thus, what has been shown and described is a programmable overload circuit which permits better accuracy while requiring less power wiring than conventional overload relays.

While there has been shown and described what are at present considered to be the preferred embodiments of the present invention, modifications thereto will readily occur to those skilled in the art. It is not desired, therefore, that the invention be limited to the specific arrangements shown and described, but it is intended to cover all such modifications and alterations which fall within the true spirit and scope of the invention as defined in the appended claims.

What is claimed is:

1. An overload protective circuit for a load drawing current from a power source and being operable to effect a predetermined operation in response to a thermal overload condition of said load comprising:

(a) digital memory means programmed with discrete multi-bit data words representative of the temperature characteristic of said load for plural values of load current and being operable in response to an applied address signal corresponding to the value of the present load current and the present load temperature to provide a digital output signal having a predetermined number of bits representative of a predicted load temperature to be reached by said load in a predetermined elapsed time interval and at least one bit adapted to signal a predetermined temperature level being reached by said load;

(b) means providing and coupling a digital signal proportional to the absolute value of the load current to said memory means as a partial address signal;

(c) means coupled to said memory means and being operable to temporarily store said predetermined number of bits of said output signal for said predetermined elapsed time interval and thereafter feed said predetermined number of bits back to said memory means as a partial address signal corresponding to the present load temperature, said partial address signals being applied concurrently as a composite address signal to said memory means; and (d) means responsive to said at least one bit of said digital output signal and being adapted to effect said predetermined operation when said predetermined temperature level is signalled.

2. The overload protective circuit as defined by claim 1 wherein said digital output signal has at least one other bit adapted to signal a second predetermined temperature level being reached by said load, and additionally including means responsive to said one other bit to effect another predetermined operation when said second predetermined temperature level is signalled.

3. The overload protective circuit as defined by claim 2 wherein said first recited predetermined operation comprises activating an alarm indicator and said another predetermined operation comprises activating a trip circuit for disconnecting said load from said power source.

4. An overload protective circuit for an electric motor coupled to a power source through circuit means which are adapted to operate in response to a control signal applied thereto and being operative to disconnect the motor from the power source in response to a predetermined temperature level being reached by said motor and comprisin combination:

(a) means providing an analog signal proportional to the present value of a motor operating parameter;

(b) means coupled to said analog signal and providing a digital signal from said analog signal;

(c) a digital memory including plural input address lines and plural output lines and having selectively addressed plural memory locations programmed with multi-bit digital data words selected bits of which contain discrete motor operating temperature values and at least one bit of which is adapted to signal a thermal overload condition, said at least one bit being adapted to be coupled to a predetermined output line;

(d) means coupling said digital signal to selected ones of said input address lines of said memory to form a first partial address signal for a specific memory location;

(e) a periodically triggered digital data latch having plural input and output lines, said input lines of said latch being coupled to selected ones of said output lines of said memory and said output lines of said latch being coupled to selected other ones of said input address lines of said memory to thereby form a second partial address signal which together with said first partial address signal forms a complete address signal for a specific memory location, whereupon a specific data word is provided to said output lines of said memory at regular time intervals in response to periodic triggering; and (f) means coupled to said predetermined output line of said memory and being responsive to a predetermined value of said at least one bit to generate said control signal to disconnect the motor from the power source.

5. The overload protective circuit as defined by claim 4 and additionally including, (g) circuit means coupled to said digital latch for periodically applying trigger signals thereto whereupon data applied at said input lines from said selected ones of said output lines of said memory is transferred and latched to said output lines causing said second partial address signal to change accordingly.

6. The overload protective circuit as defined by claim 5 wherein said means for providing a digital signal from said analog signal comprises an analog to digital converter, and additionally including, (h) means for supplying a clock signal to said analog to digital converter and means for initiating periodic starting and restarting of the analog to digital signal conversion and wherein the periodic starting and restarting is at a relatively faster rate than the periodic triggering of said latch.

7. The overload protective circuit as defined by claim 4 wherein said memory comprises a programmable read only memory.

8. The overload protective circuit as defined by claim 4 wherein said means providing an analog signal proportional to a motor operating parameter comprises means for providing a signal proportional to the absolute value of motor armature current and wherein said selected bits of each data word containing discrete time related motor operating parameter values comprises predicted temperature values for the present value of motor current.

9. The overload protective circuit as defined by claim 4 wherein each data word in said memory includes another bit which is adapted to signal a thermal overload condition, said another bit being adapted to be coupled to another predetermined output line; and additionally including (g) means coupled to said another predetermined output line of said memory and being responsive to a predetermined value of said another bit to generate another control signal prior to the generation of said first recited control signal.

10. The overload protective circuit as defined by claim 9 wherein said another control signal is adapted to initiate an alarm and wherein said first recited control signal is adapted to disconnect the motor from the power source.

11. The overload protective circuit as defined by claim 4 wherein said means providing a digital signal comprises a clocked analog to digital converter and additionally including,
- (g) first and second reference signal means respectively providing a relatively high frequency clock signal and a relatively low frequency clock signal;
- (h) means coupling said high frequency clock signal to said analog to digital converter for operating said converter at a relatively fast rate; and
- (i) means coupling a sub-multiple of said low frequency clock signal to said digital data latch for triggering said latch at a relatively slow rate.

12. The overload protective circuit as defined by claim 11 and additionally including,
- (j) means coupled to said high frequency clock signal and said low frequency clock signal and being operable to apply a start conversion signal to said analog to digital converter, said conversion signal being generated from said high frequency clock signal once every cycle of the low frequency clock signal.

13. The overload protective circuit as defined by claim 11 wherein said means (i) coupling a sub-multiple of the low frequency clock signal comprises a counter circuit.

14. The overload protective circuit as defined by claim 13 and additionally including,
- (j) means coupled to said counter circuit and being responsive to a selected speed signal for altering the operation of said counter on demand to increase the triggering rate of the latch.

15. The overload protective circuit as defined by claim 11 and additionally including,
- (j) memory reset means coupled to said low frequency clock signal and being operative to apply triggering pulses to said latch at said relatively low frequency clock signal rate.

* * * * *